United States Patent [19]

Judkins

[11] 3,793,111
[45] Feb. 19, 1974

[54] MEMBRANE PACKAGE CONSTRUCTION
[75] Inventor: Alfred E. Judkins, Waterford, N.Y.
[73] Assignee: General Electric Company, Schenectady, N.Y.
[22] Filed: Mar. 20, 1972
[21] Appl. No.: 236,276

[52] U.S. Cl................... 156/253, 55/158, 156/291, 156/299
[51] Int. Cl............................................. B01d 53/22
[58] Field of Search... 156/250, 264, 297, 299, 291; 55/16, 158, 502; 210/321

[56] References Cited
UNITED STATES PATENTS
| | | | |
|---|---|---|---|
| 3,564,819 | 2/1971 | Neulander et al. | 55/158 |
| 3,416,985 | 12/1968 | Dounoucos | 156/289 |
| 3,354,618 | 11/1967 | Dounoucos | 55/158 |
| 3,661,721 | 5/1972 | Rodgers | 55/158 |

Primary Examiner—Alfred L. Leavitt
Assistant Examiner—Frank Frisenda, Jr.
Attorney, Agent, or Firm—Leo I. MaLossi; Joseph T. Cohen; Jerome C. Squillaro

[57] ABSTRACT

An improved process for the preparation of a packaged membrane device is described whereby alternating diagonally-located confined areas of fluid sealant are prepared on each screen separator as it is incorporated in a stack between spaced membranes disposed in substantially parallel surface-to-surface array. After the package components are stacked, the sealant areas cured and the assembly sealed around the periphery, holes are drilled into the package in line with the areas of confined cured sealant to develop the manifold system and define a first group of flow volumes and a second group of flow volumes alternating between the first group. The completed structure is essentially the structure described and claimed in U.S. Pat. No. 3,564,819 - Neulander et al.

4 Claims, 3 Drawing Figures

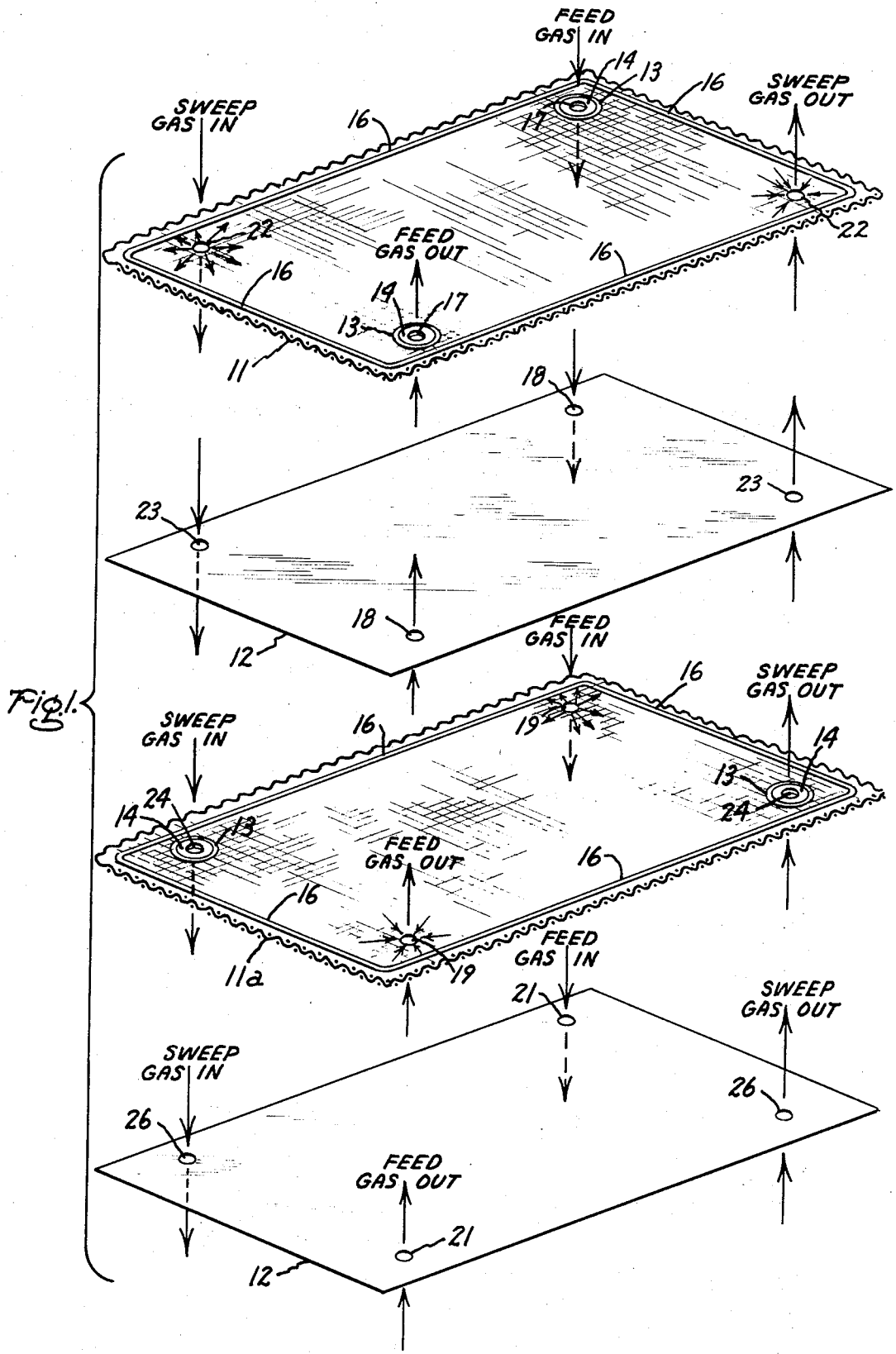

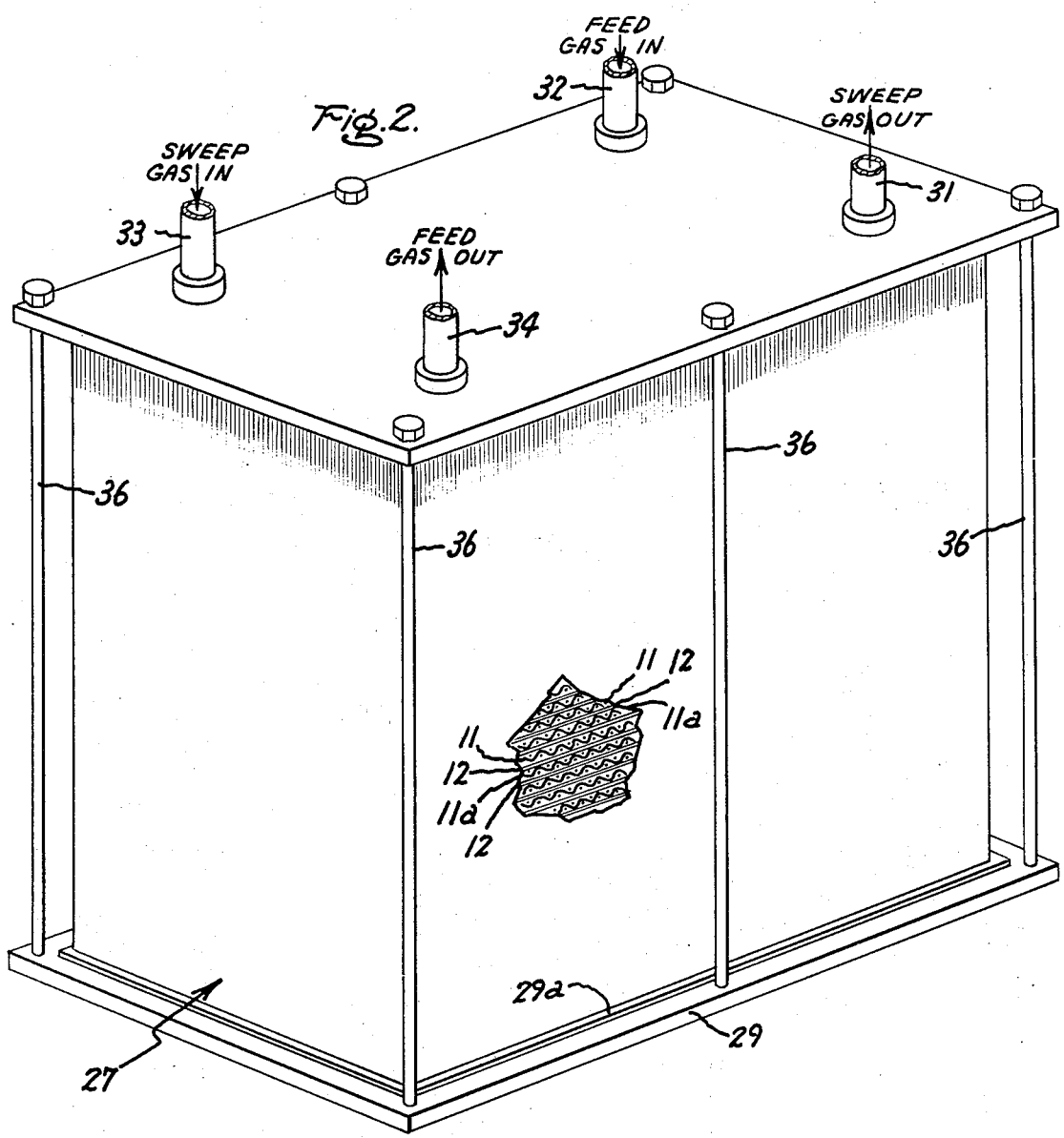
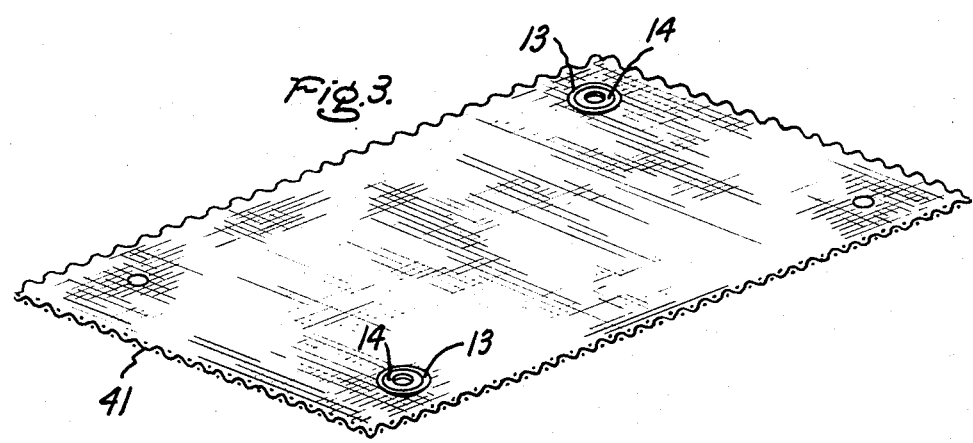

MEMBRANE PACKAGE CONSTRUCTION

BACKGROUND OF THE INVENTION

The invention herein described was made in the course of, or under, a contract with the Atomic Energy Commission.

U. S. Pat. Nos. 3,354,618 - Dounoucos and 3,416,985 - Dounoucos disclose membrane package construction in which a) a plurality of spaced membranes are disposed in substantially parallel surface-to-surface array to define both a first group of flow volumes and a second group of flow volumes alternating between the first group, b) a separating screen is located in each of the flow volumes, c) means are provided for bonding together the edges of the layered assembly of membranes and separating screens into a sealed composite and d) separate means are provided by which access to and egress from each of the groups of flow volumes are achieved, entry to the flow volumes being made through the bonded edges of the device.

U. S. Pat. No. 3,564,819 - Neulander et al. (incorporated by reference) provides a significant improvement over the aforementioned construction by the use of a manifolding arrangement by which access and egress into the flow volumes is accomplished in a direction transverse to the direction in which the flow channels extend by utilizing a plurality of discontinuous channels having gas-tight walls extending between adjacent membranes. Each channel places into flow communication a pair of adjacent flow volumes of the same group while the gas-tight wall defining each channel bonds together the portion of the spacing means (e.g., separating screen) embedded therein and portions of the membranes located at each end of the wall.

SUMMARY OF THE INVENTION

This invention is an improved process for the preparation of membrane package construction having the discontinuous manifolding feature of the Neulander et al. patent. Confined areas of fluid sealant and a continuous peripheral bead of fluid sealant are disposed on each flat screen separator for contact with adjacent membrane sheets as the screen separator is incorporated into the stack in an alternating arrangement with membrane sheets. The locations of the confined areas in the stack of screen separators are vertically aligned and are disposed in out-of-register positions on adjacent screen separators as in Neulander et al.

BRIEF DESCRIPTION OF THE DRAWING

The exact nature of this invention as well as objects and advantages thereof will be readily apparent from consideration of the following specification relating to the annexed drawing in which:

FIG. 1 is an exploded view of the screen separators and interposed membrane construction showing each screen separator as it would appear before potting of the completed stack (the end plates and gaskets are not shown);

FIG. 2 is a three-dimensional view of a membrane package in which the instant invention may be employed and FIG. 3 is a view of a modified construction of spacing means in accordance with this invention.

DESCRIPTION OF THE PREFERRED EMBODIMENT

The instant invention may be applied to the preparation of gas separation devices, gas concentrator devices, blood oxygenators, dialysis units, heat exchangers, etc. Utilization thereof for the preparation of gas separation devices will be described by way of example.

A repetitive stack arrangement comprising separator screen 11, membrane 12, separator screen 11a and the next membrane 12 is shown in FIG. 1. Membranes 12 are merely used in repetition (between each pair of separator screens 11, 11a).

Preferably, separator screens 11, 11a are woven screens e.g., polyester or nylon monofilament screen cloth having mesh openings in the range of about 400 microns to about 1,200 microns and an open area ranging from about 45 to 55 per cent. Other sizes of mesh openings and percentages of open area may be used depending upon the strength of the membranes employed, the pressure difference prevailing across the membrane and the criteria to be set for fluid flow through the screens. Screens prepared from other materials may be employed so long as the material is capable of retaining its structural integrity under the operating conditions and is compatible with the fluids employed.

In a gas separation device imperforate membranes that permit certain specific gases or vapors to pass therethrough to the substantial exclusion of others would be employed. The preparation of such membranes is disclosed in U. S. Pat. No. 3,396,510 - Ward et al.; U. S. Pat. No. 3,335,545 - Robb et al. and U. S. Pat. No. 3,325,330 - Robb, for example. Excellent capability for resisting pressure differential has been obtained with immobilized liquid membranes in which the liquid is lodged in the pores of a microporous layer made of a material wet by the liquid used. By way of example, an immobilized liquid membrane was prepared by impregnating a 0.005 inch thick sheet of the filter material sold under the trademark "Solvinert" (0.25 micron nominal pore size) with a saturated cesium bicarbonate aqueous solution. Tests have shown that the bubble point (the pressure needed to dislodge the liquid from the pores) for this material is at least 30 psi, if the Solvinert is soaked in cesium bicarbonate solution containing a small concentration of wetting agent soluble in the system, e.g., 1 percent by weight of low molecular weight (400–1,000) polyethylene glycol. This material (Solvinert) appears under infrared analysis to be a terpolymer of polyvinyl alcohol, polyvinyl chloride and polyvinyl acetate.

Other membrane materials useful as immobilizing mediums for various liquids wet thereby include the ultrafine porous polymer membrane disclosed in U. S. Pat. application Ser. No. 127,848 - Weininger et al. (filed Mar. 24, 1971 and assigned to the assignee of the instant invention) and the materials described in U. S. Pat. Nos. 3,378,057 - Sargent et al.; 2,984,869 - Honey et al.; 3,351,489 - Larson et al.; 3,216,882 - Feldt et al. and 3,062,760 - Dermody et al. The disclosures of the aforementioned patent application and patents are incorporated herein by reference in their entirety.

Before stacking the membranes 12 with separator screens 11, 11a therebetween, the separator screens must be prepared so that after the assembly and potting steps (which follow) have been executed and the potting medium has hardened (cured), the manifolding system may be developed simply by drilling holes vertically through the package in the proper locations.

The separator screen preparation comprises impregnating each separator screen with diagonally-located dams 13. Each dam 13 is shown in circular configuration, however, any closed curve configuration will suffice (e.g., square). As may be seen from FIG. 1, screens 11 and 11a differ in that dams 13 are located on different diagonals. Preferably, the material of which the dams 13 are composed will be a chemically inert self-setting liquid which sets or cures as an elastomeric material. The top and bottom of each dam 13 should be flush with the adjacent screen surface. The screens may be prepared identically and set aside for dams 13 to cure. Each dam 13 defines a small area, which during assembly (to be described below) is filled with a fluid material (this material may be the same as the material used for dams 13) that wets, and bonds to, the membranes 12 adjacent each screen. The term "fluid" as employed herein means that even though the material may be quite viscous it can be made to flow. Separator screen 11 actually differs from separator screen 11a only in its orientation in the assembly (screen 11, when turned over, is the same as screen 11a) as may be seen in FIG. 1. Because of this difference in orientation and the repetition in sequence of these two orientations, each of the two different dispositions of defined small areas will be vertically aligned with similar areas of the same category, when screen separators and membranes have been stacked.

When the desired number of dam-impregnated separator screens have been prepared and the dams have been cured, the membranes and separating screens are assembled. In the assembly of these components, a separator screen (e.g., screen 11a) is placed on a flat surface and the screen area within each dam 13 is filled with and penetrated by sealant 14 in the fluid state to wet the surface below. Thereafter, a continuous narrow bead 16 of fluid sealant material is laid down near the perimeter of the screen. A membrane 12 is then lowered on to the first screen into contact with sealant areas 14 and bead 16. A second screen with the second orientation of dams 13 is placed on the membrane 12 and the process of filling dams 13 with fluid sealant, running sealant bead 16 and lowering the next membrane 12 into place is repeated. As the assembly continues, each sealant-filled dam in the second and subsequent screens will overlie a location in the separator screen immediately therebelow from which the dam and sealant fill are missing. The filled dams of alternate separator screens, however, will be in vertical alignment in all four corners. The utilization of exactly two dams per screen is typical, but not essential, as arrangements with more than two dams may be employed.

When stacking of the membranes 12 and screen separators 11, 11a has been completed to yield the desired number of flow chambers, the assembly is clamped and the sealant in area 14 and beads 16 is allowed to cure. Thereafter, each edge of the assembly may be immersed in a potting compound to further insure sealing of the sides of the assembly.

The potting liquid, when employed, is specifically selected to have the following properties:
a. it must wet the membrane surface,
b. it must wet and form an adhesive bond with the membrane material,
c. it must be a viscous liquid containing little or no diluent,
d. it must be chemically inert to the materials with which it must come into contact,
e. it must be self-setting and
f. it must set as a non-porous barrier (capable of preventing the flow of gas therethrough in those constructions in which gas separations are to be effected).

An example of a suitable potting compound for use with Solvinert membranes in which a liquid membrane has been immobilized is a bisphenol-A based epoxy resin to which has been added a catalyst system consisting of a modified polyamine plus polyamide. Another useful potting material is polyester adhesive.

The dam material is preferably an elastomer such as room temperature vulcanizing silicone rubber, although other materials such as wax or putty may be satisfactorily employed for the damming (or containing) function.

The sealant material should be fluid, be compatible with the other materials employed and must wet, and bond to, the screen separators and membranes.

After completion of the potting operation and subsequent curing, the edges of each membrane and separator screen in the assembly become bonded into unified walls for the device.

When the potting material has hardened, holes are drilled through the package transverse to the direction of the planes of the laminae. In each case the drill is located in alignment with one vertical disposition of areas 14. The drill will then pass through each screen and through each sealant area 14 encountered to form the requisite vertical manifolding arrangement. Thus, in the assembled membrane package for the arrangement shown in FIG. 1, the same sequence of holes 17, 18, 19, 21 is developed in a repeating pattern in two diagonally-located corners and another sequence of holes 22, 23, 24, 26 is developed in a repeating pattern in the other two diagonally-located corners. In this way the flow patterns shown for feed gas (in and out) and sweep gas (in and out) as separate flows is accommodated.

The membrane package 27 is then sandwiched between metal end plates 28, 29 and gaskets (the bottom gasket 29a alone is shown) provided with holes matching with the locations of the drill holes for developing the vertical manifolding arrangements. End plates 28, 29 serve both to force the gaskets into sealing engagement with the membrane package 27 and to provide terminals for conduits 31, 32, 33 and 34 as shown in FIG. 2. Fasteners 36 arranged around the perimeter of the device as shown in FIG. 2 provide biasing force for the end plates.

Optionally, the first and last laminae of the membrane package 27 may be of solid sheet material, e.g., sheet metal to provide stiffness and protection for the package. When employed, such stiffener sheets become an integral part of the package after the potting operation. End plates and gaskets are then employed as described hereinabove.

In operation a flow of feed gas entering through conduit 32 will exit via holes 19 in vertical alignment therewith to pass through alternate flow channels comprising a first flow volume group. This feed gas stream sweeps over the surfaces of membrane 12 forming the boundaries (top and/or bottom) of these flow channels on the way to exit via holes 19 forming part of the vertical manifold arrangement leading to conduit 34. Simultaneously, the sweep gas stream enters conduit 33 and passes via holes 22 in vertical alignment therewith into the second set of flow channels in alternating arrangement with the first flow channel group. The sweep gas stream exits via holes 22 in the vertical manifold system leading to conduit 31.

In addition to simplifying the entire assembly operation this invention enables the selection of sealants from a much broader class then the method described in Neulander et al in which the viscosity of the potting liquid (relied upon to form the manifold structure) is a determining factor in fixing the minimum spacing between membranes 12. High viscosity sealants (adhesives) may now be used regardless of membrane spacing.

At each hole 17, 24 provided through the sealant areas 14, the downwardly directed fluid flow is prevented from entering the horizontal flow channel in which the sealant mass 14 is located, because of the confining walls formed by the cured (or hardened) sealing material. These confining walls serve to unify the screen separator embedded therein together with each membrane 12 located at an upper and/or lower face of each area 14.

The preferred arrangement for preparation of the screen separators has been described above. A modified arrangement for preparation of the screen separators is shown in FIG. 3 in which the screen separators (e.g., screen separator 41) are not provided with bead 16. In this construction reliance for edge sealing is placed solely on the cured potting compound.

In the practice of this invention, the technician should first select the appropriate membrane material for the exchange mechanism to be conducted. Next the area of membrane to be used and the residence time/flow volume requirements are determined based upon some given pattern of gas exchange (counter current flow, cross flow, etc.). In many instances, the technician is faced with a dimensional problem and/or a weight problem for the package and these criteria will determine the selection of membrane thicknesses, screen separator thicknesses, mesh sizes, etc. Once the selection of materials for these components has been made, the selection of material for the dam construction, the sealant for areas 14, beads 16 and the potting material may be easily selected in accordance with the guidelines provided hereinabove.

What I claim as new and desire to secure by Letters Patent of the United States is:

1. In a method for the preparation of a packaged membrane system in which a plurality of sheet-like membranes and sheet-like screen separators are disposed in alternating sequence in a stack by the steps of:

a. impregnating each screen with a pattern of damming means,
   b. arranging the sheet-like screens so modified and the membranes in overlying stacked arrangement with one membrane located between each pair of said screens, the damming means of alternate screens being in vertical alignment,
   c. immersing each edge of the assembly of membranes and screens in turn in a self-sealing potting liquid to a depth to permit penetration of the potting liquid into preselected accessible areas defined by damming means,
   d. permitting said penetrating potting liquid to cure and
   e. drilling holes through the resulting integrated package transverse to the major membrane/screen areas, the holes passing through said areas defined by damming means, the improvement of substituting for steps a, b and c the following steps executed in sequence:

f. preparing each damming means in the shape of a closed curve,
   g. filling each of the small areas defined by the damming means on a first screen with fluid sealant material,
   h. covering said first screen and sealant material with a first membrane,
   i. disposing a second screen over said first membrane with the damming means thereof out-of-register with the damming means of said first screen,
   j. filling each of the small areas defined by the damming means on said second screen with fluid sealant material,
   k. covering said second screen and sealant material with a second membrane,
   l. disposing a third screen over said second membrane with the damming means thereof in vertical alignment with the damming means of said first screen,
   m. filling each of the small areas defined by the damming means on said third screen with fluid sealant material,
   n. covering said third screen and sealant material with a third membrane,
   o. disposing a fourth screen over said third membrane with the damming means thereof in vertical alignment with the damming means of said second screen,
   p. repeating the screen preparation and stacking sequence set forth in the preceding steps to incorporate the desired number of membrane-lined flow channels into an assembly,
   q. permitting the fluid sealant material to harden and
   r. immersing each edge of said assembly in turn in a potting liquid sufficient to seal together the perimeters of the screens and membranes.

2. The improvement recited in claim 1 wherein silicone rubber is employed as the damming material.

3. The improvement recited in claim 1 wherein during screen preparation fluid sealant is deposited on each screen both within the dammed areas and as a continuous bead adjacent the perimeter of each screen.

4. The improvement recited in claim 1 wherein the material employed for the preparation of the damming means is different from the fluid sealant material employed.

* * * * *